No. 772,080. Patented October 11, 1904.

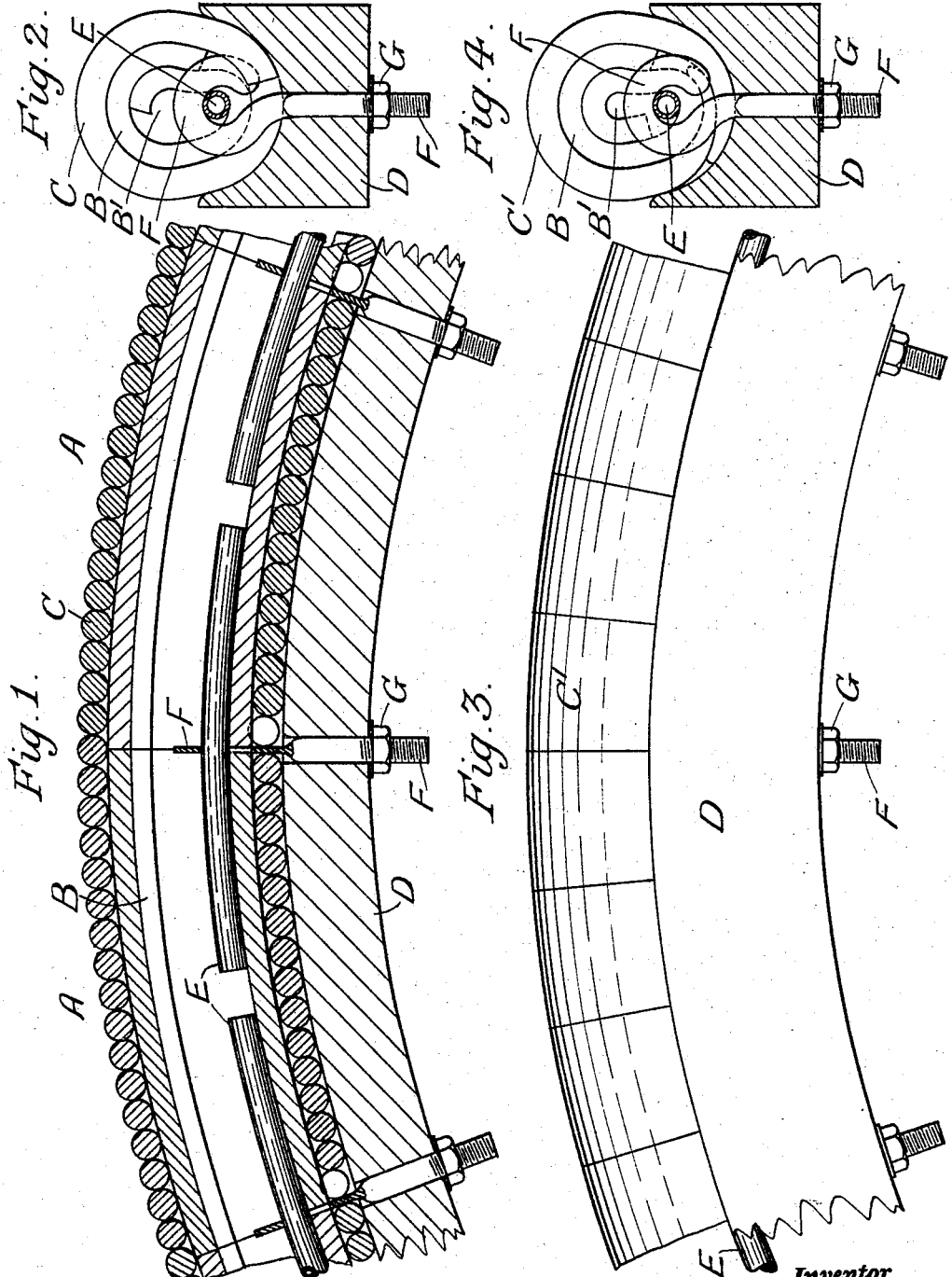

UNITED STATES PATENT OFFICE.

ROBERT BELL, OF GLENAE, SCOTLAND.

CUSHIONED RUBBER TIRE FOR VEHICLES.

SPECIFICATION forming part of Letters Patent No. 772,080, dated October 11, 1904.

Application filed April 25, 1904. Serial No. 204,859. (No model.)

*To all whom it may concern:*

Be it known that I, ROBERT BELL, a subject of the King of the United Kingdom of Great Britain and Ireland, and a resident of Glenae, Dumfries, Scotland, have invented certain new and useful Improvements in Cushioned Rubber Tires for Wheels, of which the following is a specification.

This invention relates to wheel-tires composed of rubber; and it has for its object to provide an improved construction of tire in which the liability to puncture of pneumatic tires and the hardness or want of resiliency of solid rubber tires are alike avoided, while the cost is lessened and repair facilitated by building up the tire of a number of separable segments each composed of an inner rolled-up sheet of inexpensive rubber and an outer covering of tough rubber wound in rings or convolutions around it, these segments being secured to the wheel-rim in such wise that any one or more of them may be conveniently removed and replaced.

The invention is illustrated by the accompanying drawings, in which—

Figure 1 is a longitudinal section of part of a wheel-rim as fitted with the improved tire, and Fig. 2 is a cross-section thereof, while Fig. 3 is an elevation, and Fig. 4 a cross-section, showing a slightly-modified construction.

As shown by the drawings, the improved tire is composed of a number of segments A A, each composed of a sheet or sheets of rubber or like resilient material, which is firmly rolled or wound in cylindrical form, so as to constitute one or more arches, as indicated at B, and is covered by rolling around it a cord or rod C of rubber of higher quality in convolutions, as indicated at Fig. 1, or by means of rings C' of rubber molded to the form indicated at Fig. 2 and fitted to closely encircle the inner roll B. These rings may be in short lengths, as shown, or in greater lengths to cover each a complete segment of the inner rolled sheet.

The outer layer or cover C or C' of the tire may be solutioned or cemented to the inner roll B, and the latter may be wound hard to approximately resemble a solid core, or, as is shown, it may inclose an air-space at B'. In each case the segments A A are secured within the wheel-rim D (which is of any usual construction) by means of tubes or rods E extending within the inner rolls B and each engaging with an adjoining pair of segments, the said tubes or rods being each firmly held so as to draw down the tire and secure it within the wheel-rim by means of an eyebolt F passing through the felly of the wheel and tightened by a screw-nut G. The individual segments A A may be solutioned or cemented together at their meeting ends; but the end pressure will in general suffice to hold them close together, the outer covering C or C' not being under tension, and consequently not being so liable to wear out as is a stretched covering.

In a tire constructed as described any segment A may be readily taken out and replaced by undoing a pair of the bolts F, and repair of an injured part is easily effected, and in the form represented at Fig. 1 a fresh tread may be presented for wear by unwinding the convolutions of the outer covering C and rewinding it, the form of tread also having the advantage of lessening liability to skid or side slip.

Having now described my invention, what I claim, and desire to secure by Letters Patent of the United States, is—

1. An arched rubber wheel-tire, comprising, in combination, an inner roll of sheet-rubber rolled to approximately cylindrical form, means for securing said roll to the wheel, and an outer covering of rubber surrounding said roll, substantially as described.

2. An arched rubber wheel-tire, comprising, in combination, a plurality of rolls of sheet-rubber rolled to approximately cylindrical form composing a segmental inner tire, means for securing said rolls to the wheel, and an outer covering of rubber surrounding said rolls, substantially as described.

3. An arched rubber wheel-tire, comprising, in combination, a plurality of rolls of sheet-rubber rolled to approximately cylindrical form composing a segmental inner tire, rods extended through said rolls, eyebolts for securing said rods to the wheel, and an outer covering of rubber surrounding said rolls, substantially as described.

4. An arched rubber wheel-tire, comprising, in combination, a plurality of rolls of sheet-rubber rolled to approximately cylindrical form composing a segmental inner tire, rods extending through said rolls each engaging an adjoining pair of segments, eyebolts securing said rods to the wheel, and an outer covering of rubber unsubjected to tension, substantially as described.

5. An arched rubber wheel-tire, comprising, in combination, a plurality of rolls of sheet-rubber rolled to approximately cylindrical form composing a segmental inner tire, tubular rods extending through said rolls each engaging an adjoining pair of segments, eyebolts securing said rods to the wheel, means for adjusting said eyebolts, and an outer covering of rubber unsubjected to tension, substantially as described.

6. An arched rubber wheel-tire, comprising, in combination, an inner roll of sheet-rubber rolled to approximately cylindrical form, means for securing said roll to the wheel, and a cord of rubber wound around said roll, substantially as described.

7. An arched rubber wheel-tire, comprising, in combination, a plurality of rolls of sheet-rubber rolled to approximately cylindrical form, composing a segmental inner tire, means for securing said rolls to the wheel, and a cord of rubber wound around said rolls and forming the outer cover, substantially as described.

8. An arched rubber wheel-tire, comprising, in combination, a plurality of rolls of sheet-rubber rolled to approximately cylindrical form composing a segmental inner tire, rods extending through said rolls, eyebolts for securing said rods to the wheel, and a cord of rubber helically wound around said rolls and forming the outer cover, substantially as described.

9. An arched rubber wheel-tire, comprising, in combination, a plurality of rolls of sheet-rubber rolled to approximately cylindrical form composing a segmental inner tire, tubular rods extending through said rolls each engaging an adjoining pair of rolls, eyebolts securing rods to the wheel, means for adjusting said eyebolts, and a rubber cord helically wound around said rolls and forming the outer cover, substantially as described.

10. In a wheel-tire, in combination, the segments A of rolled rubber-sheet, rods E, eyebolts F, screw-nuts G, and the rubber cord C wound around said segments A, as shown and described.

In testimony whereof I have signed my name to this specification in the presence of two subscribing witnesses.

ROBERT BELL.

Witnesses:
WALLACE FAIRWEATHER,
JNO. ARMSTRONG, Jr.